United States Patent [19]

Hahn

[11] Patent Number: 4,470,210
[45] Date of Patent: Sep. 11, 1984

[54] MOUNTING FOR EXCAVATING IMPLEMENT AND METHOD

[75] Inventor: Frederick C. Hahn, Aloha, Oreg.

[73] Assignee: ESCO Corporation, Portland, Oreg.

[21] Appl. No.: 497,803

[22] Filed: May 25, 1983

[51] Int. Cl.³ .............................................. E02F 9/28
[52] U.S. Cl. ................... 37/142 R; 299/91; 403/381
[58] Field of Search ............... 37/64, 141 T, 142 R, 37/142 A; 299/91, 92; 403/381

[56] References Cited

U.S. PATENT DOCUMENTS

| 1,455,640 | 5/1923 | McNamara | 403/381 X |
| 1,890,997 | 12/1932 | Lane | 37/142 R |
| 2,933,295 | 4/1960 | Rollins | 299/91 |
| 2,940,192 | 6/1960 | Lattner | 37/142 R |
| 4,050,172 | 9/1977 | Petersen | 37/142 A |
| 4,086,713 | 5/1978 | White | 37/142 A |
| 4,247,147 | 1/1981 | Rettkowski | 299/92 X |
| 4,335,532 | 6/1982 | Hahn et al. | 37/142 R |

FOREIGN PATENT DOCUMENTS

| 816565 | 7/1969 | Canada | 299/92 |
| 56248 | 12/1968 | Poland | 299/92 |
| 2051184 | 1/1981 | United Kingdom | 37/142 R |

Primary Examiner—E. H. Eickholt
Attorney, Agent, or Firm—Tilton, Fallon, Lungmus & Chestnut

[57] ABSTRACT

A mounting and method for an excavating implement embodying a shank positioned within a recess, the shank and recess being equipped with confronting spherical zonal walls and the shank and recess at the apices thereof being equipped with spherical segmental walls, the shank and recess between the two sets of spherical walls providing a gap into which thermoplastic material is introducible to provide a superior and stress transmitting fit.

18 Claims, 8 Drawing Figures

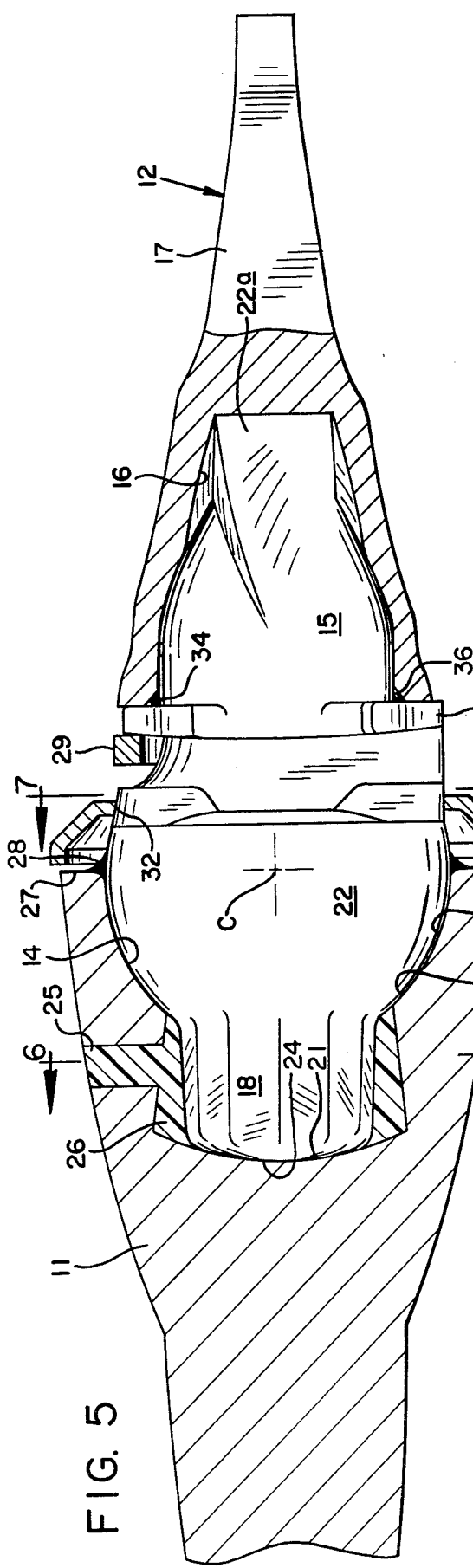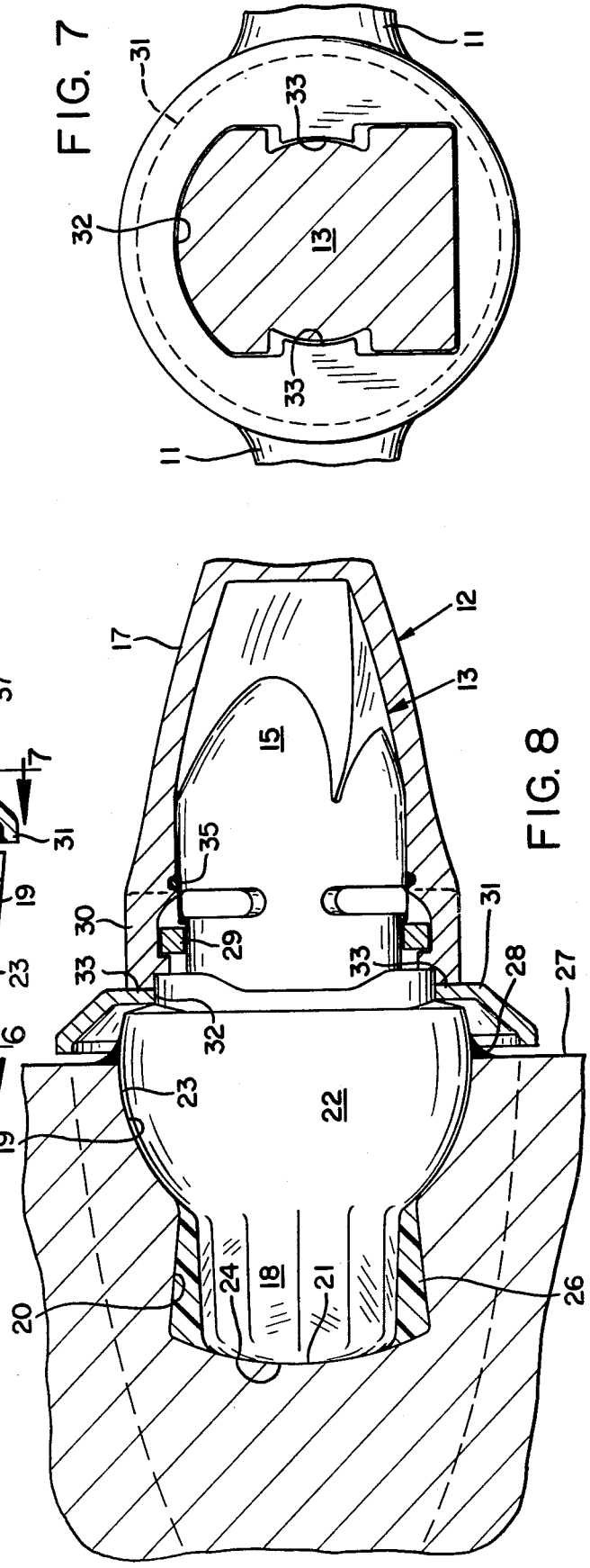

MOUNTING FOR EXCAVATING IMPLEMENT AND METHOD

This invention relates to a mounting for an excavating implement and method and, more particularly, to a mounting wherein the excavating implement is adapted to be positioned in a variety of attitudes relative to the earth being worked.

BACKGROUND OF THE INVENTION

The idea of changing the attitude or orientation of earth working teeth is not new—see, for example, U.S. Pat. Nos. 3,091,044 and 3,117,386. However, these have not been widely used because of the limited amount of change in attitude possible because of the structures involved.

SUMMARY OF INVENTION

According to the instant invention, a mounting and method of using the same is described wherein an adapter is equipped with a spherical zonal exterior wall positioned intermediate the ends of the adapter for mounting in a recess in the excavator or other earth working equipment. Further, the shank or mounting end of the adapter is sized smaller than the cooperating part of the excavator recess to permit the introduction of thermoplastic material which facilitates reorientation and also develops an advantageous, stress transmitting bit. Although the idea of introducing conformable material into the socket of an excavating tooth is old—see U.S. Pat. No. 1,399,337, this did not facilitate repositioning.

Other objects and advantages of the invention may be seen in the ensuring specification.

The invention is described in conjunction with the accompanying drawing, in which FIG. 1 is a perspective view of a dredge cutter head which utilizes the teachings of the instant invention with one tooth in exploded form;

FIG. 5 is a fragmentary elevational view, partially in section of an assembled tooth mounted on the cutterhead;

FIG. 7 is a sectional view taken along the sight line 7—7 of FIG. 5; and

FIG. 8 is another fragmentary sectional view of the assembly of the assembled tooth but taken at right angles to that seen in FIG. 5, i.e., a top view as contrasted to a side view.

DETAILED DESCRIPTION

Figure 1:
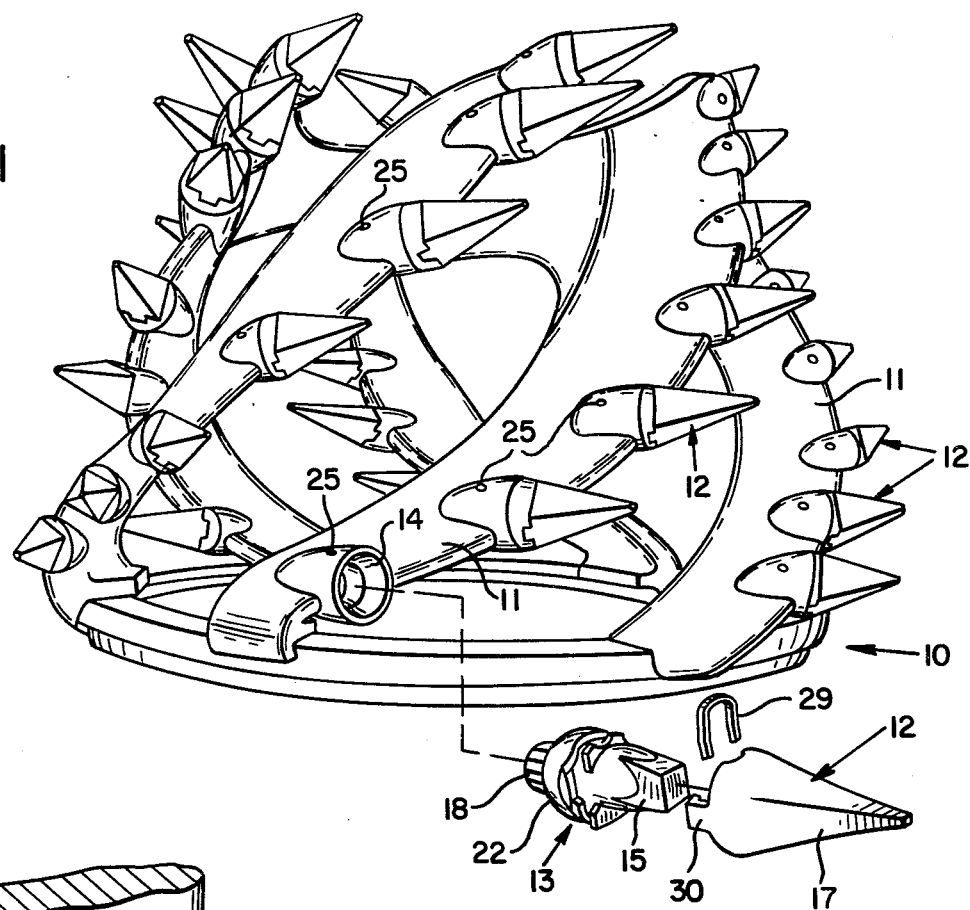

In the illustrated given and with reference first to FIG. 1, the numeral 10 designates generally a dredge cutterhead which, in accordance with convention design, is equipped with a plurality of spiral arms 11 and with each arm being equipped with a plurality of teeth 12 thereon. As illustrated, the cutterhead 10 has five arms 11 and each arm is equipped with seven teeth 12. It will be appreciated that different designs of cutterheads may have fewer or more arms and varying number of teeth on each arm according to the particular design.

As can be appreciated from the lower right hand portion of FIG. 1, each tooth 12 includes an adapter 13 releasably fixed to the arm by mounting in an integral socket 14. The adapter 13 is equipped with a nose 15 to be received within the socket 16 (see FIG. 5) of the point 17. Further details of the preferred form of locking mechanism may be seen in co-owned U.S. Pat. No. 4,335,532.

Figure 2:
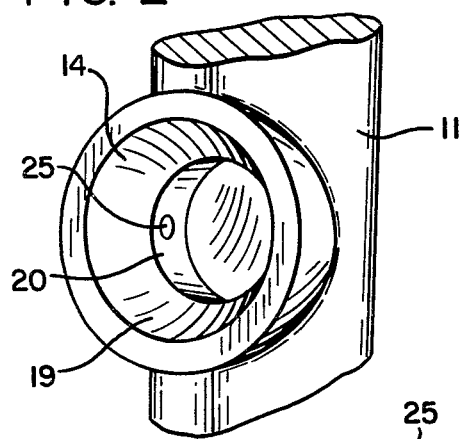
FIG. 2 is a fragmentary perspective view of the recess portion of an excavator such as would be provided at various locations on the arms of the dredge cutterhead of FIG. 1.
Figure 4:
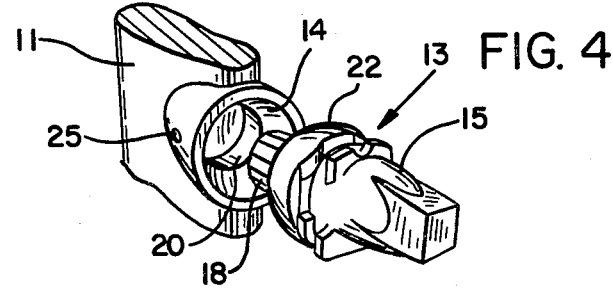
FIG. 4 is a fragmentary perspective view of the mounting portion of FIG. 2 into which the preferred form of adapter is about to be inserted.
Figure 3:
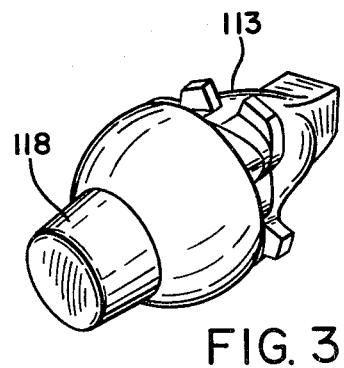
FIG. 3 is a perspective view of a modified form adapter embodying teachings of the invention.

Turning now to FIG. 2, a portion of the cutterhead arm 11 is seen in enlarged condition. For the purpose of locating each adapter 13, the arm is provided with a plurality of openings, one of which is designated 14 in FIG. 2 (also see FIG. 4). The adapter 13 of FIG. 4 is the preferred version having a polygonally shaped shank as at 18. On the other hand, in some instances, the adapter 113 of FIG. 3 may be employed which is equipped with a cylindrical shank as at 118.

The details of the inventive structure and the operation thereof constituting the inventive method may be better appreciated from a consideration of FIG. 5.

In FIG. 5, the portion of the arm 11 is again seen in fragmentary form. Here it will be appreciated that the invention is not limited to dredge cutterheads and the like, but may be employed advantageously with a wide variety of excavating or earth moving implements. However, the invention is especially advantageous in connection with the dredge cutterhead because of the need of orienting the excavating implements, i.e., the teeth 12 in a variety of attitudes.

In FIG. 5, the recess or socket is again designated 14 and is seen to be outwardly facing. Immediately adjacent the outer ends of the recess 14, the recess wall 19 is shaped in the form of a spherical zone, i.e., a shape defined by passing spaced apart planes through a sphere parallel to the equator thereof. Inwardly of the spherical zonal wall 19 the recess 14 is defined by a generally frusto-conical wall 20. Lastly, the apex of the recess 14 is defined by a spherical segmental interior wall 21. Spherical segments have been employed before on excavating teeth bearing surfaces as can be seen from co-owned U.S. Pat. No. 3,012,346.

Mounted within the recess 14 is the shank portion 22 of the adapter 13. Here it will be appreciated that, in conventional fashion, the adapter 13 has a mounting end including the shank 22 and a working end 22a, but which carries the point 17. The illustrated embodiment is particularly advantageous but it will be appreciated that a variety of working ends also may be employed advantageously in connection with the practice of the invention, viz., different forms of securing the replaceable point, solid teeth, etc.

The shank 22 (still referring to FIG. 5) has a spherical zonal exterior wall 23 which is arranged in bearing engagement with the spherical zonal interior wall 19 of the recess 14. Rearwardly of the spherical zonal wall 23, i.e., in the direction away from the working end of the adapter 13, the shank 22 is equipped with an integral reduced cross sectional area portion 18. Lastly, the extreme end of the shank 22, i.e., the mounting end, terminates in an end wall 24 which again is a spherical segment like the interior end wall 21 of the recess 14.

Figure 6:
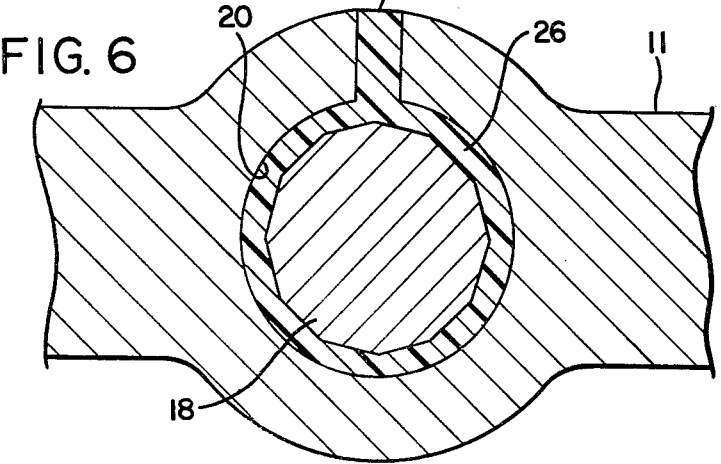
FIG. 6 is a sectional view taken along the sight line 6—6 of FIG. 5.

The shank portion 18 can be seen in cross section in FIG. 6 and has the shape of a regular polygon. Twelve sides are depicted and these are seen to be in spaced relation from the interior wall 20 of the mounting part 11. It will be appreciated that the number of sides in the polygonal shank 18 can be varied.

OPERATION

In operation, the shank 22 of the adapter 13 is introduced into the recess 14 of the mounting part 11. By virtue of the confronting walls 19 and 23, the adapter 13 can be rotated both about longitudinal and transverse axes to a desired attitude. In the illustration given, movement about transverse axes is of the order of about 6°—as determimned by the rearward divergence of the frusto-conical wall 20. Thereafter, a thermoplastic material such as epoxy resin in liquid form is introduced into the port 25 (see also FIG. 6) so as to fill the generally annular shaped space 26 between the polygonal walls of the shank portion 18 and the frusto-conical interior wall 20. I have found it advantageous to condition the steel surface of 22 beforehand through the use of grease, vaseline or some other material that will create a film on the surface of the steel. Once the thermoplastic material hardens, a polygonal socket is formed within the recess 14 so that should additional repositioning be indicated so as to dispose the adapter 13 in a different attitude, it merely has to be removed from the recess and then indexed to proper position, i.e., in 30° increments in the twelve sided polygon as illustrated.

The adapter 13 just forward of the shank 22 is advantageously spherically shaped as at 23 so as to provide a surface normal to the forwardly facing wall 27 of the mounting part 11. The junction of the surfaces 23 and 27 are advantageously employed for the location of simple low cost fillet weld 28 so as to secure the adapter immovably in place within the recess 14. The weld can be easily introduced by fully automatic welding equipment due to the full circle weld area. When a replacement adapter is required, such as due to inadvertent breakage of the nose element, the weld is removed and a new adapter is installed quickly in the receiving thermoplastic cavity. If it is desired to change the attitude of the adapter so as to optimize the wear pattern of the point 17, as by indexing in increments, the weld can be readily removed. For that matter, should a different adapter nose angle be desired, the mounting part 11 can be heated to cause the thermoplastic material to melt and run out so that the installation procedure can be repeated. Thus it can be seen that only a matter of minutes are involved with changing an adapter rather than the existing art which involves the work of an operator to position the adapter with a sweep gauge and weld the legs of the adapter to the cutter arms.

In the illustration given, the point 14 is secured to the adapter 13 by means of a mechanical lock 29 of the form described in greater detail in the above-identified co-owned U.S. Pat. No. 4,335,532. For example, the point 17 is equipped with rearwardly extending tongues 30 (compare FIGS. 8 and 1). These are shaped to receive the mechanical lock 29 and, in the illustration given, perform a further function in retaining the socket wear shield 31—see particularly FIG. 7. The shield 31 is slipped over the adapter nose 15 and protects the fillet weld 28 between the adapter and socket wall and also serves to deflect or throw material over the top face of the socket to eliminate or at least greatly reduce wear on the outside surface of the socket-providing arm or other mounting. The shield 31 is essentially circular and has a central aperture 32 (see FIG. 7) which conforms to the shape of the adapter nose just forward of the adapter shank 22. The aperture is shaped to provide opposed, inwardly extending lug portions 33 which are aligned with the ears 30 (see FIG. 8).

Also, in the illustration given, an O-ring seal 34—see the central portions of FIGS. 5 and 8—is employed to prevent abrasive fines from entering the point socket 16. This greatly reduces the wear of the bearing between the point socket and nose, thereby lenghtening the life of the nose. For this purpose, the tongues 30 adjacent the socket 16 are each equipped with a groove 35 (see FIG. 8) which serves to conveniently support the O-ring 34 during installation. The remainder of the O-ring is supported between the confronting portion of the nose and a champfer 36 on the point adjacent the rear of the socket—see FIG. 5. Thereafter, the O-ring is somewhat deformed—from a circular to an oval or semi-oval configuration by virtue of the point being seated against the segmented rib 37 of the adapter. This rib 37, as brought out in U.S. Pat. No. 4,335,532 also serves to support and maintain the lock 29 (see FIG. 5).

As indicated previously, the thermoplastic material not only develops a sure and superior fit between the recess 14 and the shank 22 but also can serve as a stress transmitting medium. Its use converts the tension and bending normally encountered by the shank 18 to essentially compression loads—thus greatly increasing the strength of the system without weight penalty.

For example, it is not usually possible to obtain a bearing fit (even with new castings or forgings) between both the spherical zonal walls 19 and 23 and the spherical segmental walls 21 and 24. Therefore, the spherical zonal walls are normally cast for a bearing fit with a slight clearance between the spherical segmental walls 24 and 21. This gap (not shown) is filled with the thermoplastic material so as to transmit stresses and the epoxy resin employed has been found to have ability to carry compressive stress.

More particularly, the provision of the spherical zonal bearing surfaces 19 and 23 permits positions of the adapter 13 by rotation either about a longitudinally extending axis (360°) or about a transverse axis. This insures that the optimum digging angle is achieved. These spherical zonal bearing surfaces 19 and 23 are advantageously generated about a center of revolution C located forwardly of the polygonal cross-section portion of said shank, viz., in the plane of the forwardly facing wall 28.

After the desired nose angle has been achieved—normally but not limited to plus or minus 6° movement as determined by the rearward divergence of the frusto-conical wall 20—epoxy resin or similar thermoplastic material is added to fill the void area 26.

The resultant assembly converts the external bending, shearing and tensive loads to essentially compressive loads. The result is higher strength to weight ratios, lower manufacturing and field maintenance costs which greatly improve the economic advantage of the product. The polygonal shaped shank provides additional angular flexibility by index rotation to improve the tooth penetration and/or wear life. Field replacement of a broken, worn or deformed nose is thus accomplished in minutes rather than hours with much less damage to the base material from the heat associated with burning and welding. In the event changes in individual tooth position or all positions longitudinally and/or transverse angles are required to change the digging characteristics, a few hundred degrees of torch-applied heat will melt out all of the thermoplastic material very easily. A new adapter position can then be established in the manner previously described.

While in the foregoing specification a detailed description of the invention has been set forth for the purpose of explanation, many variations in the details hereingiven may be made by those skilled in the art without departing from the spirit and scope of the invention.

I claim:

1. A mounting for an excavating implement adapted to position said implement in a variety of attitudes comprising:

a metal support structure having an outwardly facing recess and a metal excavating implement having a penetrating end and a mounting end, said mounting end including a shank mounted in said support structure recess and means coupling said support structure and excavating implement for maintaining the latter in a predetermined attitude, said shank having a spherical zonal exterior wall spaced from said mounting end and an end wall at said mounting end, said recess having an interior wall portion positioned in bearing relation to said shank spherical zonal exterior wall, said shank in the portion between spherical zonal exterior wall and said end wall being spaced from the wall of said recess confronting said portion, and thermoplastic material in the space between said confronting interior wall of said recess and shank portion.

2. The structure of claim 1 in which said shank portion has a polygonal cross section.

3. The structure of claim 1 in which said supporting structure is equipped with a port communicating with said space for the introduction of said thermoplastic material.

4. The structure of claim 1 in which said support structure is equipped with an exterior wall about said recess, and weld material connecting said exterior wall with said spherical zonal exterior wall for securing said support structure and excavating implement in temporary immobile relation.

5. The structure of claim 1 in which said excavating implement is an adapter equipped with a nose at its penetrating end, a socket-equipped point mounted on said nose, and a generally circular shield interposed between said point and said metal support structure for protecting said coupling means.

6. The structure of claim 5 in which said coupling means is a perimetric weld.

7. The structure of claim 1 in which said excavating implement is an adapter equipped with a nose at its penetrating end, a socket equipped point mounted on said nose, said socket having an open end, and a deformable O-ring positioned in said socket adjacent said open end for cooperating with said adapter to prevent entry of material into said socket.

8. A mounting for an excavating implement adapted to position said implement in a variety of attitudes comprising:

a metal support structure having an outwardly facing recess and a relatively elongated metal excavating implement having a penetrating end and a mounting end, said mounting end including a shank mounted in said support structure recess and means coupling said support structure and excavating implement for maintaining the latter in a predetermined attitude, said shank having a spherical zonal exterior wall spaced from said mounting end and a spherical segmental wall at said mounting end, said recess having interior wall portions positioned generally complementarily to said shank spherical zonal and segmental walls, said spherical zonal walls being arranged in bearing relation, said shank in the portion between spherical zonal exterior wall and said spherical segmental wall being spaced from the confronting interior wall of said recess, and thermoplastic material in the space between said confronting interior walls of said recess and shank portion.

9. The structure of claim 8 in which the wall of said recess confronting said shank diverge toward said mounting end to provide for limited rotational movement of said excavating implement about an axis transverse to the length thereof.

10. An excavating implement adapted to be positioned in a variety of attitudes comprising a relatively elongated, unitary member having a mounting end and working end, said member being equipped with a shank extending from said mounting end partway toward said working end and said shank being adapted to be received in a mounting recess provided in a piece of excavating equipment, said shank at the end thereof adjacent said working end being equipped with an integral laterally enlarged portion defining an exterior spherical zonal wall having a larger zone end and a smaller zone end, said smaller zone end being located closer to said mounting end than said larger zone end, said shank between said smaller zone end and said mounting end having a generally uniform cross section in proceeding along the length thereof, said exterior spherical zonal wall being continuous to permit positioning of said implement in a variety of angles relative to transverse axes.

11. The structure of claim 10 in which said generally uniform cross section is that of a regular polygon.

12. The structure of claim 10 in which said mounting end includes a spherical segmental end wall having a circumference coincident with the perimeter of said shank generally uniform cross section.

13. An excavating implement adapted to be positioned in a variety of attitudes comprising a relatively elongated, unitary member having a rear mounting end and forward working end, said member being equipped with a shank extending from said mounting end partway toward said working end and said shank being adapted to be received in a mounting recess provided in a piece of excavating equipment, said shank at the end thereof adjacent said working end being equipped with an integral laterally enlarged portion defining an exterior spherical zonal wall having a center of revolution positioned adjacent said working end, said exterior spherical zonal wall being continuous to permit positioning of said implement in a variety of angles relative to transverse axes.

14. A method of mounting an excavating implement comprisng:

providing a support structure having an outwardly facing recess and an excavating implement having a forward penetrating end and a rear mounting end, said mounting end including a shank adapted to be mounted in said support structure recess, said shank having a spherical zonal exterior wall spaced from said mounting end and an end wall at said mounting end, said recess having interior wall portions adapted to be positioned complementarily to said shank spherical zonal wall, said shank in the portion rearward of said spherical zonal exterior wall having a smaller cross sectional area than the portion of said recess rearward of the spherical zonal interior wall thereof, introducing said shank into said recess with the spherical zonal walls of said shank and recess being disposed in confronting, contacting relation, orienting said excavating implement to a predetermined attitude, temporarily securing said excavating implement to said support structure, introducing liquid thermoplastic material into the space between said shank and recess and solidifying said material.

15. The method of claim 14 in which the temporary securement of said excavating implement to said mounting structure is removed, said shank having a polygonal cross sectional portion and said solidified thermoplastic material providing a complementary polygonal cross section socket, removing said excavating implement from said recess and repositioning the same so as to bring different polygonal walls of said shank and socket into confronting relation.

16. The method of claim 14 in which the securement of said excavating implement to said mounting structure is removed, said excavating implement being rotated to a new predetermined attitude, and thereafter temporarily secured again to said mounting structure.

17. The method of claim 14 in which said temporary securement includes welding said shank spherical zonal exterior wall to an exterior wall of said support structure adjacent said outwardly facing recess.

18. A method of mounting an excavating implement comprising:

providing a support structure having an outwardly facing recess and an excavating implement having a penetrating end and a mounting end, said mounting end including a shank adapted to be mounted in said support structure recess, said shank having a spherical zonal exterior wall spaced from said mounting end and a spherical segmental wall at said mounting end, said recess having interior wall portions adapted to be positioned complementarily to said shank spherical zonal and segmental walls, said shank in the portion between said spherical zonal exterior wall and said spherical segmental wall having a smaller cross sectional area than the portion of said recess between the spherical zonal interior wall and spherical segmental wall thereof, introducing said shank into said recess with the spherical zonal walls of said shank and recess being disposed in confronting, contacting relation, orienting said excavating implement to a predetermined attitude, temporarily securing said excavating implement to said support structure, introducing liquid thermoplastic material into the space between said shank and recess and solidifying the same.

* * * * *